US008635404B2

(12) United States Patent
Li et al.

(10) Patent No.: US 8,635,404 B2
(45) Date of Patent: Jan. 21, 2014

(54) DATA TRANSFER SYSTEMS WITH POWER MANAGEMENT

(75) Inventors: Jeng-Luen Li, San Jose, CA (US); Kugao Ouchi, Palo Alto, CA (US)

(73) Assignee: O2Micro, Inc., Santa Clara, CA (US)

( * ) Notice: Subject to any disclaimer, the term of this patent is extended or adjusted under 35 U.S.C. 154(b) by 221 days.

(21) Appl. No.: 13/333,483

(22) Filed: Dec. 21, 2011

(65) Prior Publication Data

US 2013/0166817 A1 Jun. 27, 2013

(51) Int. Cl.
*G06F 12/00* (2006.01)

(52) U.S. Cl.
USPC .......................................................... 711/115

(58) Field of Classification Search
None
See application file for complete search history.

(56) References Cited

U.S. PATENT DOCUMENTS 6,098,132 A * 8/2000 Olarig et al. .................. 710/302
7,213,086 B2 * 5/2007 Wyatt et al. ..................... 710/52
7,898,841 B2 * 3/2011 Chevallier et al. ............ 365/148

* cited by examiner

*Primary Examiner* — Hiep Nguyen

(57) ABSTRACT

A controller for transferring data between a host and a storage medium includes a data transfer unit and a control unit. The data transfer unit transfers data according to control commands from the host if the data transfer unit is enabled. The control unit coupled to the data transfer unit receives a status signal indicating whether the storage medium is coupled to a socket of the controller. The control unit provides interruption signals to the host. Power and a clock signal for the control unit are disabled if the status signal indicates that the storage medium is decoupled from the controller.

17 Claims, 5 Drawing Sheets

DATA TRANSFER SYSTEMS WITH POWER MANAGEMENT

BACKGROUND

A storage medium such as a memory card or a flash media card is a data storage device and can be used in electronic devices and systems, including digital cameras, mobile phones, laptop computers, media players, video game consoles, etc. The storage medium can be re-recordable, and can retain data without power. A card reader is attached to a host, e.g., a personal computer, and has a socket to connect a storage medium. When a storage medium is coupled to the socket, the card reader can transfer data between the host and the storage medium.

FIG. 1 shows a conventional data transfer system 100. The data transfer system 100 includes a host 102, a controller 104, and a storage medium 108, e.g., a flash media card. The controller 104 includes a data transfer unit 110, a control unit 112, a filter 124 and a socket 106. A data path, including the data transfer unit 110 and the data lines 165 and 152, is used to transfer data between the host 102 and the storage medium 108. A control path, including the control unit 112, the filter 124, and the control lines 164, is used to control the data transfer of the data transfer system 100.

The control unit 112 and the filter 124 monitor the status of the storage medium 108, e.g., whether the storage medium 108 is coupled to the socket 106. In operation, if the storage medium 108 is coupled to the socket 106, the socket 106 generates a monitoring signal 150 to the filter 124. The filter 124 removes noises of the monitoring signal 150 and provides the status signal 154 to the control unit 112. The control unit 112 further includes a card detection circuit 122 and an interruption circuit 120. The card detection circuit 122 coupled to the filter 124 receives the status signal 154 and enables the data transfer unit 110 if the status signal 154 indicates that the storage medium 108 is coupled to the socket 106. The interruption circuit 120 generates an interruption signal 164 in response to the status signal 154. The interruption signal 164 is transferred to the host 102 according to a standard interface protocol, for example, Peripheral Component Interconnect-Express (PCIe), Universal Serial BUS (USB), Serial Advanced Technology Attachment II (SATA2), or Advanced Technology Attachment (ATA). Upon receiving the interruption signal 164, the host 102 reads the status register of the interruption circuit 120 to obtain the status information of the storage medium 108. If the storage medium 108 is coupled to the socket 106, the host 102 can control the data transfer unit 110 to exchange data with the storage medium 108.

However, when the storage medium 108 is decoupled from the socket 106, the control unit 112 keeps being powered on, such that the control unit 112 can generate the interruption signal 164 once the storage medium 108 is inserted again. As such, the power consumption of the data transfer system 100 is relatively high.

SUMMARY

In one embodiment, a controller for transferring data between a host and a storage medium includes a data transfer unit and a control unit. The data transfer unit transfers data according to control commands from the host if the data transfer unit is enabled. The control unit coupled to the data transfer unit receives a status signal indicating whether the storage medium is coupled to a socket of the controller. The control unit provides interruption signals to the host. Power and a clock signal for the control unit are cut off if the status signal indicates that the storage medium is decoupled from the controller.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1:
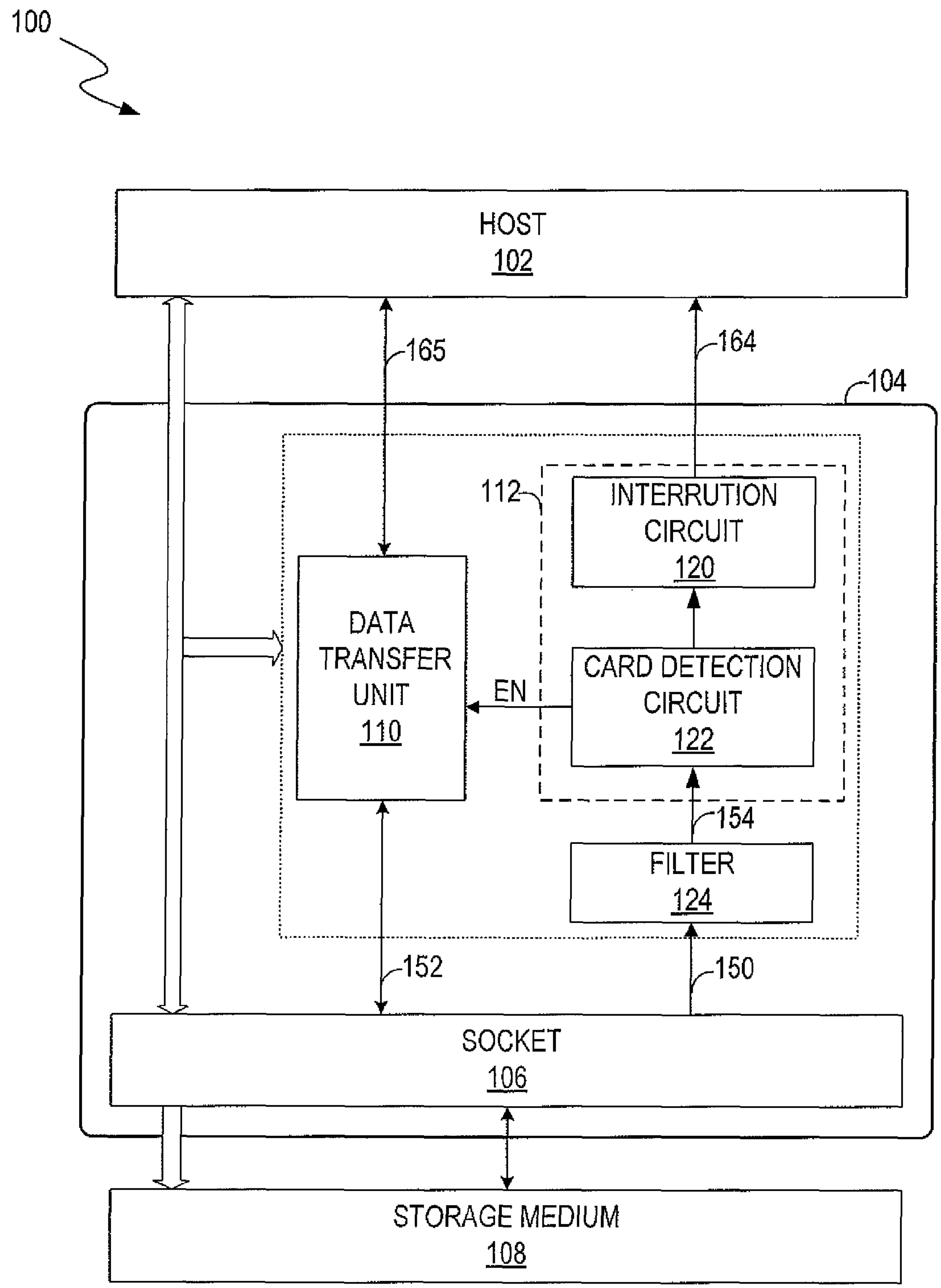
FIG. 1 illustrates a block diagram of a conventional data transfer system.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "receiving," "transferring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2:
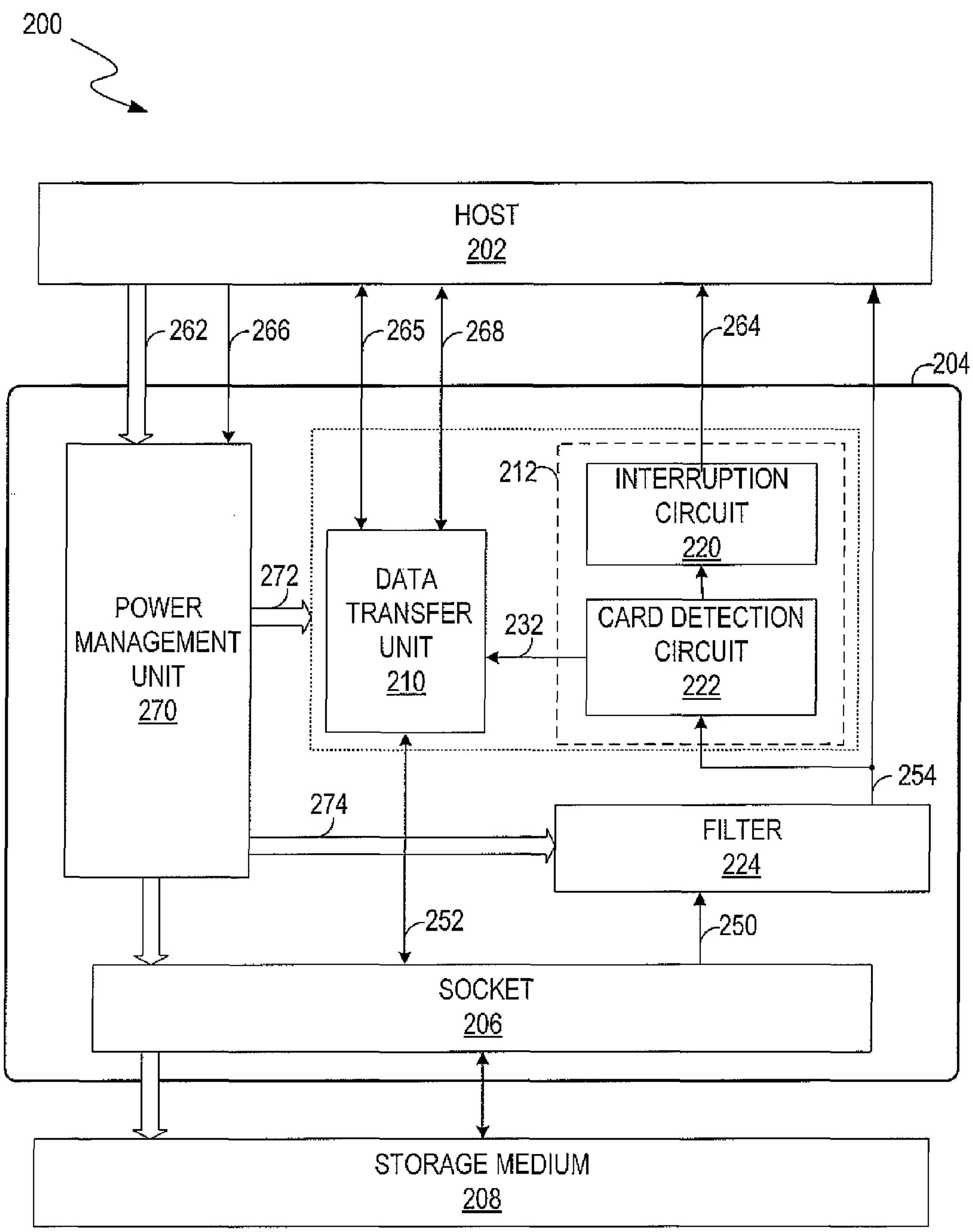
FIG. 2 illustrates a block diagram of a data transfer system, in accordance with one embodiment of the present invention.

FIG. 2 illustrates a block diagram of a data transfer system 200, in accordance with one embodiment of the present invention. In the example of FIG. 2, the data transfer system 200 includes a host 202, a controller 204, and a storage medium 208. The storage medium 208 can be, but is not limited to, a card-shaped storage medium such as a flash media card or a memory card. The host 202 can be an electronic device or system, such as a computer, a personal digital assistance (PDA), a mobile phone, or the like. The controller 204 coupled between the host 202 and the storage medium 208 is configured to transfer data according to the control commands from the host 202, and to monitor the status of the storage medium 208, e.g., whether the storage medium 208 is coupled to the controller 204. In one embodiment, the controller 204 includes a socket 206, a filter 224, a control unit 212, and a data transfer unit 210.

In one embodiment, the socket 206 coupled between the storage medium 208 and the filter 224 can be coupled to various types of storage medium. For example, the socket 206 can be a TF (Trans-Flash) type to be coupled to a TF card, or a SD (Secure Digital) type to be coupled to a SD (Secure Digital) card. The socket 206 generates a monitoring signal 250 indicating a status of the storage medium 208, e.g., whether the storage medium 208 is coupled to or decoupled from the socket 206. For example, the monitoring signal 250 can be a one-bit digital signal having a first state, e.g., digital one, and a second state, e.g., digital zero. By way of example, when the monitoring signal 250 is digital one, it indicates that a storage medium is coupled to the socket 206. When the monitoring signal 250 is digital zero, it indicates that the storage medium is decoupled from the socket 206.

The filter 224 coupled to the socket 206 can be, but is not limited to, a Kalman filter, and is configured to receive the monitoring signal 250 and to eliminate or reduce noises of the monitoring signal 250 to generate a status signal 254. The status signal 254 is transferred to both the control unit 212 and the host 202. In one embodiment, the status signal 254 is used by the control unit 212 to enable or disable the data transfer unit 210, and is used by the host 202 to control power delivered to the controller 204.

The control unit 212 coupled to the filter 224 includes a card detection circuit 222 and an interruption circuit 220. The card detection circuit 222 is configured to generate an enable signal 232 to enable or disable the data transfer unit 210 according to the status signal 254. More specifically, if the status signal 254 indicates that a storage medium 208 is coupled to the socket 206, the card detection circuit 222 enables the data transfer unit 210. Accordingly, the data transfer unit 210 can transfer data if the host 202 generates control commands via a control line 268 to request a data transfer. If, however, the status signal 254 indicates that the storage medium 208 is decoupled from the socket 206, the card detection circuit 222 disables the data transfer unit 210. Thus, the data transfer unit 210 does not transfer data even if the host 202 requests a data transfer.

The interruption circuit 220 is coupled to one or more functional components such as the card detection circuit 222 and the data transfer unit 210. The interruption circuit 220 monitors statuses of the functional components and generates interruptions to the host 202 according to the statuses. In one embodiment, the interruption circuit 220 generates an interruption if an error occurs to a functional component. In another embodiment, the interruption circuit 220 generates an interruption if a status of a functional component is changed. Upon receiving the interruption, the host 202 checks the interruption circuit 220, e.g., by reading interruption registers contained in the interruption circuit 220, to further obtain information of the corresponding functional component. In one embodiment, the card detection circuit 222 generates an interruption signal indicating that the data transfer unit 210 is enabled. The interruption circuit 220 receives the interruption signal from the card detection circuit 222, and generates an interruption signal 264 to the host 202, indicating that the data transfer unit 210 is ready for the data transfer.

The data transfer unit 210 coupled between the host 202 and the socket 206 transfers data between the host 202 and the storage medium 208. In one embodiment, when the data transfer unit 210 is enabled by the enable signal 232, the data transfer unit 210 transfers data from the storage medium 208 to the host 202 if the host 202 transmits a read command via 268 to the data transfer unit 210, and transfers data from the host 202 to the storage medium 208 if the host 202 transmits a write command via line 268 to the data transfer unit 210.

In one embodiment, the host 202 provides power and a clock signal to the controller 204 and the storage medium 208 through the power and clock signal lines 262. The host 202 further determines whether to provide the power and the clock signal to a particular unit in the controller 204 and generates a power/clock control signal 266 to control the delivery of the power and the clock signal accordingly. In one embodiment, the controller 204 includes a power management unit 270 coupled to the host 202. The power management unit 270 receives the power/clock control signal 266, and delivers the power and the clock signal to different units in the controller 204 accordingly.

In the example of FIG. 2, the power management unit 270 has lines 272 for providing the power and the clock signal to the data transfer unit 210 and the control unit 212, and has a line 274 for providing the power to the filter 224. The filter 224 has its own clock signal inside, in one embodiment. Therefore, the control unit 212 and the filter 224 can have different power and clock conditions according to the power/clock control signal 266 from host 202. In an alternative embodiment, the power management unit 270 is included in the host 202. The controller 204 can have other configurations, and is not limited to the example of FIG. 2.

Advantageously, the host 202 has a pin coupled to the filter 224, such that the status signal 254 can be directly transferred from the filter 224 to the host 202. As such, information about the status of the storage medium 208 can be forwarded to the host 202 without going through the control unit 212. In one embodiment, if the status signal 254 indicates that there is no storage medium coupled to the socket 206 of the controller 204, the power management unit 270 provides power to the filter 224 but disables (cuts off) the power and the clock signal to the data transfer unit 210 and the control unit 212 according to the power/clock control signal 266 from host 202. If the status signal 254 indicates that a storage medium is coupled to the socket 206, the power management unit 270 provides the power and the clock signal to the data transfer unit 210 and the control unit 212, and keeps providing power to the filter 224 according to the power/clock control signal 266. As neither the power nor the clock signal is provided to the data transfer unit 210 and the control unit 220 when the storage medium 208 is decoupled from the socket 206, the power consumption of the data transfer system 200 is reduced.

Figure 3:
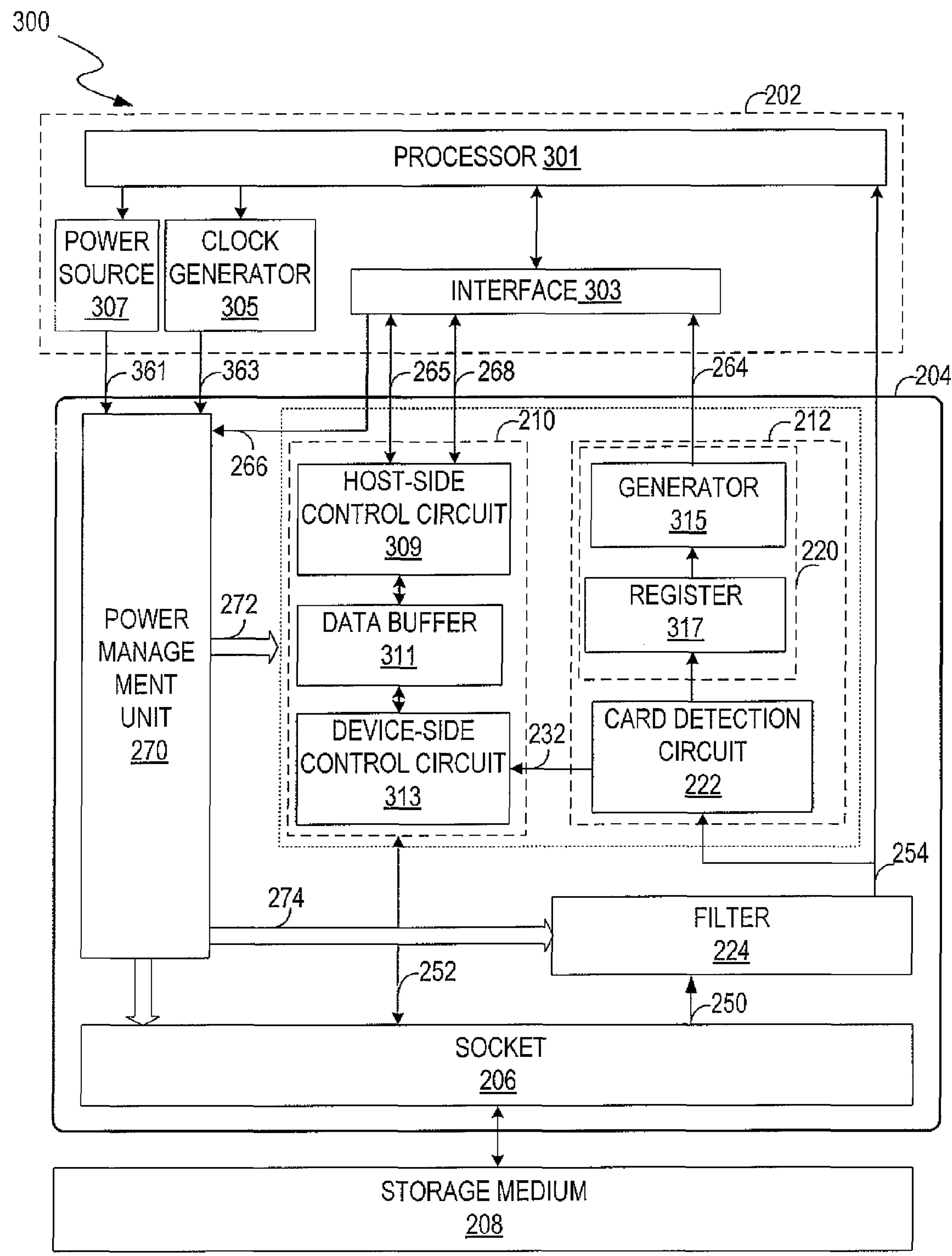
FIG. 3 illustrates another block diagram of a data transfer system, in accordance with one embodiment of the present invention.

FIG. 3 illustrates an example of a block diagram of a data transfer system 300, in accordance with one embodiment of the present invention. Elements labeled the same as in FIG. 2 have similar functions. FIG. 3 is described in combination with FIG. 2. The data transfer system 300 includes a host 202, a controller 204, and a storage medium 208, in one embodiment.

In one embodiment, the host 202 includes a processor 301, a power source 307, a clock generator 305, and an interface 303. The processor 301 can be a central processing unit (CPU), a microprocessor, a digital signal processor, or any other such device that can read and execute programming instructions. The processor 301 can execute instruction codes to generate control commands to the power source 307, the clock generator 305, and the controller 204. In operation, the processor 301 controls the power source 307 and the clock generator 305 to deliver power 361 and a clock signal 363 to the power management unit 270. The power management unit 270 provides the power 361 and the clock signal 363 to different units in the controller 204 according to the control signal 266, as described in relation to FIG. 2.

Moreover, the processor 301 exchanges data and control information with the controller 204 through the interface 303. The interface 303 serves as an I/O (input/output) interconnect between the processor 301 and the controller 204. In one embodiment, the processor 301 operates as a master to start a data transfer. The processor 301 can send the control information to the controller 204 via the interface 303. The control information can enable a hand-shake between the processor 301 and the controller 204 before the data information is transferred. The control information can define a characteristic of the data transfer, for example, whether the data is written into the storage medium 208 or read from the storage medium 208. For example, the data information can be transferred from the processor 301 to the controller 204 in a write operation, and the data information can be transferred from the controller 204 to the processor 301 in a read operation. The control information can also indicate a status of the data transfer, for example, start/initiation of the data transfer or completion of the data transfer.

In one embodiment, the interface 303 analyzes the information transferred from the processor 301 to determine if the processor 301 transfers data information or control information. The interface 303 can selectively transfer the information through a data path 265 or a control path 268 depending on whether the processor 301 transfers the data information or the control information. If the host transfers the data information, the data can be sent to the controller 204 through the data path 265. If the processor 301 transfers the control information, the control information can be sent to the controller 204 through the control path 268. Moreover, the interface 303 can convert the data information from the controller 204 into data readable by the processor 301 (computer-readable data) and transfer the data to the processor 301.

The interruption circuit 220 includes a generator 315 and a register 317. The register 317 can store the information received from the card detection circuit 222 and some other interruption information, e.g., requesting for reading data or requesting for writing data. Upon receiving the interruption information, the generator 315 generates the interruption signal 264 which is read by the processor 301.

The data transfer unit 210 coupled between the interface 303 and the socket 206 includes a host-side control circuit 309, a data buffer 311, and a device-side control circuit 313. The device-side control circuit 313 coupled between the data buffer 311 and the socket 206 receives the enable signal 232 and operates as a switch to conduct or cut off the data path 252 between the data buffer 311 and the storage medium 208 according to the enable signal 232. For example, when the storage medium 208 is coupled to the socket 206, the enable signal 232 enables the device-side control circuit 313 to conduct the data path 252. Thus, data information can be exchanged between the storage medium 208 and the buffer 311. When the storage medium 208 is decoupled from the socket 206, the enable signal 232 disables the device-side control circuit 313 to cut off the data path 252.

The host-side control circuit 309 coupled between the data buffer 311 and the interface 303 operates as a switch for controlling the host side to transfer data information. In operation, when the host 202 receives the interruption signal 264 indicating that the card detection circuit 222 enables the device-side control circuit 313, the host 202 generates control commands to enable the host-side control circuit 309 via the control path 268. Thus, the data path 265 between the data buffer 311 and the interface 303 is conducted. When both the host-side control circuit 309 and the device-side control circuit 313 are enabled, the data can be transferred between the host 202 and the storage medium 208 via the data paths 265 and 252.

The data buffer 311 coupled between the host-side control circuit 309 and the device-side control circuit 313 is configured to buffer the data information from the interface 303 and the storage medium 208. For example, when the host 202 writes data information to the storage medium 208, the data buffer 311 buffers the data information from the interface 303 and provides the data information to the storage medium 208. Similarly, when the host 202 reads data information to the storage medium 208, the data buffer 311 can buffer the data information from the storage medium 208 and provide the data information to the interface 303.

Figure 4:
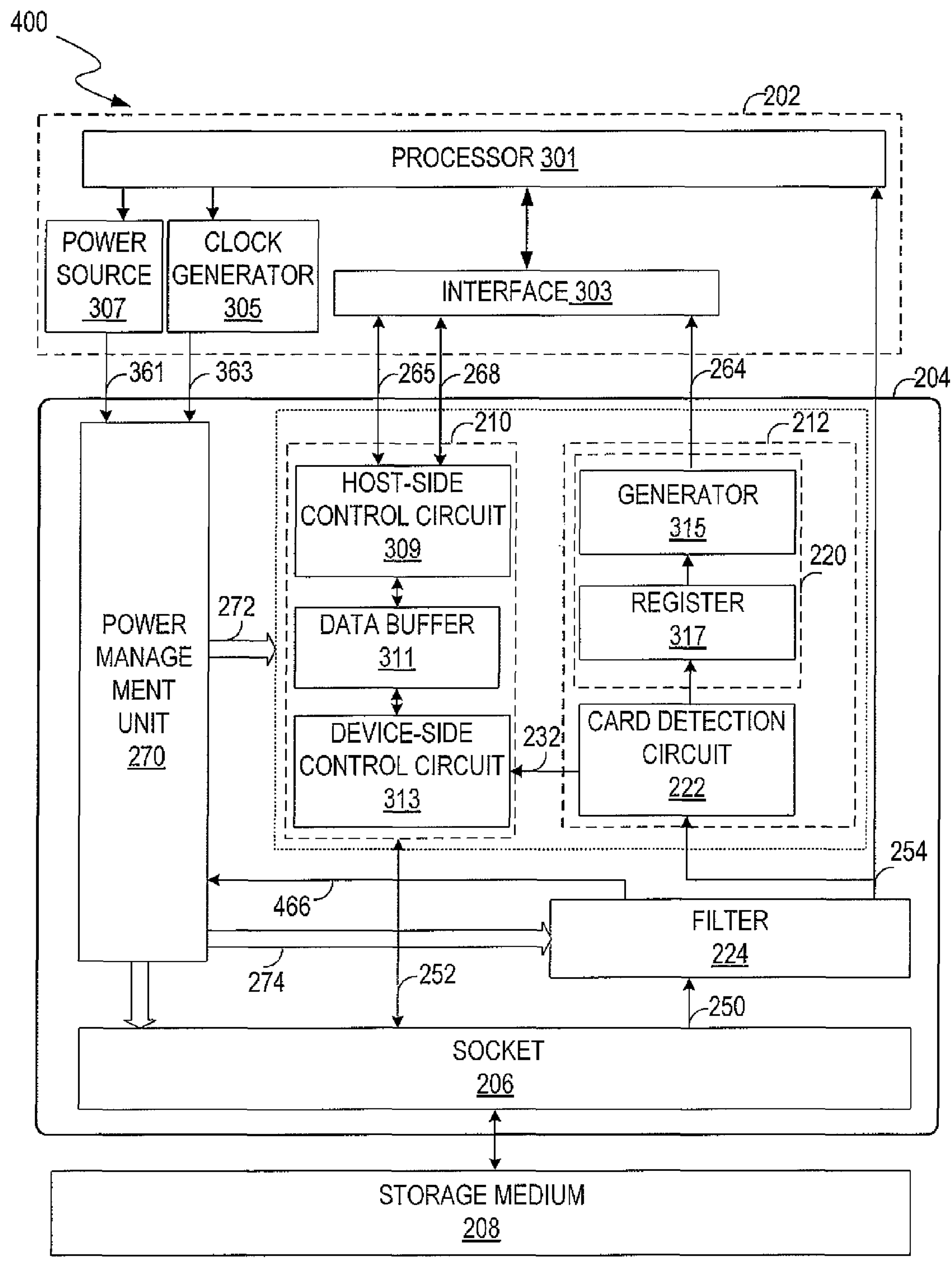
FIG. 4 illustrates another block diagram of a data transfer system, in accordance with one embodiment of the present invention.

FIG. 4 illustrates a block diagram of a data transfer system 400, in accordance with one embodiment of the present invention. Elements labeled the same as in FIG. 2 and FIG. 3 have similar functions. FIG. 4 is described in combination with FIG. 2 and FIG. 3.

In the embodiment of FIG. 4, the filter 224 is further coupled to the power management unit 270 via a signal line 466. The power management unit 270 receives the status signal 254 via the line 466 and determines how to deliver the power and the clock signal to different units in the controller 204 accordingly.

In one embodiment, when the system is initialized, the host 202 provides the power via the line 361 and the clock signal via the line 363 to the power management unit 270. The power management 270 transfers the power and the clock signal through lines 272 to the data transfer unit 210 and the control unit 212, and transfers the power through line 274 to the filter 224. In one embodiment, when the system is initialized, the whole controller 204 is powered on. In operation, the filter 224 sends the status signal 254 to the host 202, the card detection circuit 222, and the power management unit 270. Thus, the host 202, the card detection circuit 222, and the power management unit 270 obtain the status information of the storage medium 208, e.g., whether the storage medium 208 is coupled to the socket 206. If no storage medium is coupled to the socket 206, the power of the filter 224 transferred via the line 274 remains on, while the power and the clock signal of the data transfer unit 210 and the control unit 212 via lines 272 are disabled (cut off) by the power management unit 270 according to the status signal 254 via the line 466. If the storage medium 208 is coupled to the socket 206, the power management unit 270 keeps turning on the power at line 274 and the power and the clock signal at the lines 272 according to the status signal. That is, the power and the clock signal of the control unit 212 and the data transfer unit 210 are both enabled. The card detection circuit 222 receives the status signal 254 and enables the device-side control circuit 313. Accordingly, the interruption circuit 220 interrupts the processor 301 to inform that the device-side control circuit 313 is enabled. Thus, the processor 301 enables the host-side control circuit 309 if the processor 301 is ready to transfer data.

Advantageously, when the storage medium 208 is removed from the socket 206, the control unit 212 and the data transfer unit 210 are both shut off, which reduces the power consumption of the driving circuit 400.

Figure 5:
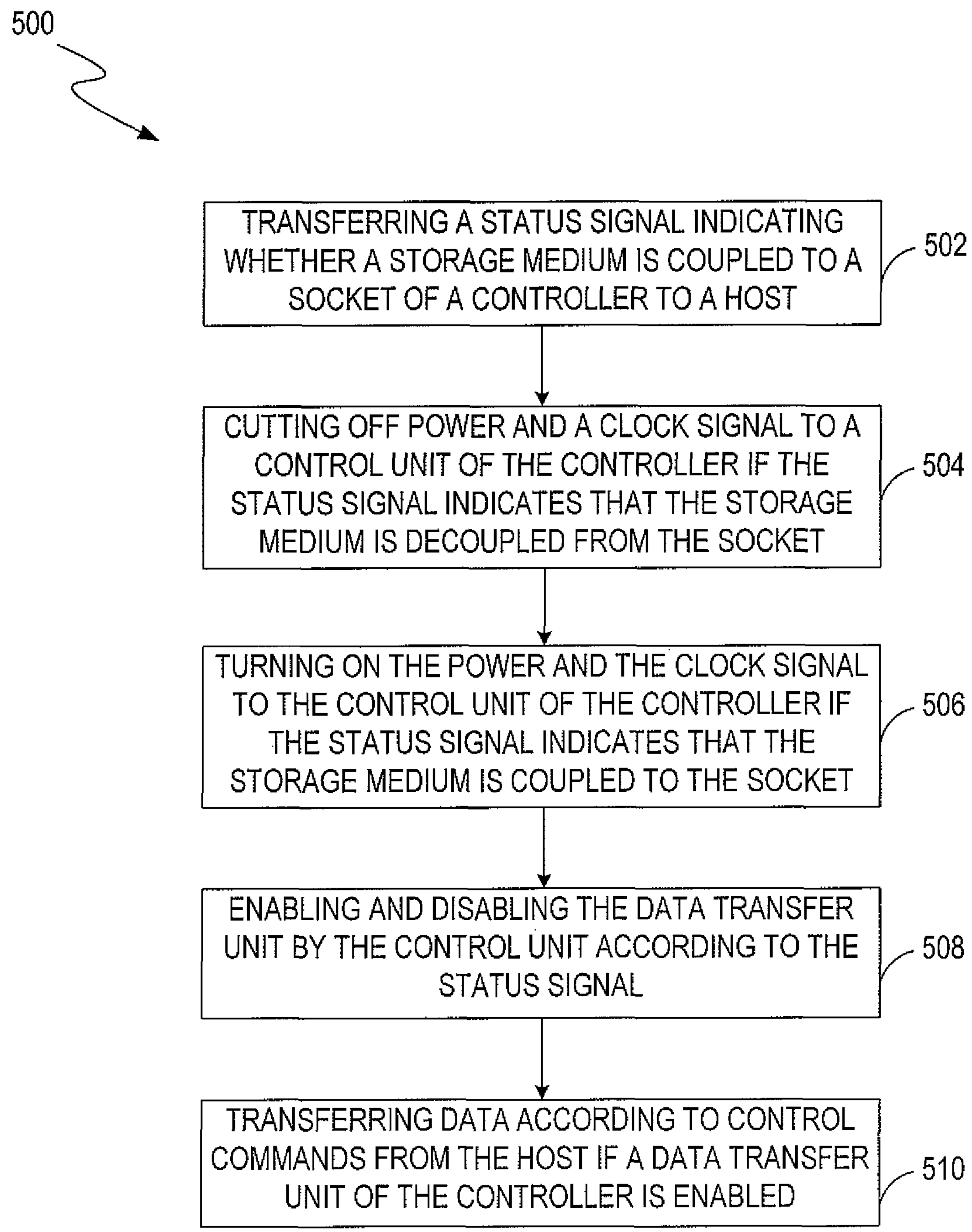
FIG. 5 is a flowchart of operations performed by a data transfer system, in accordance with one embodiment of the present invention.

FIG. 5 illustrates a flowchart 500 of operations performed by a data transfer system, e.g., the data transfer system 200, 300 or 400, in accordance with one embodiment of the present invention. Although specific steps are disclosed in FIG. 5, such steps are examples. That is, the present invention is well suited to performing various other steps or variations of the steps recited in FIG. 5.

In block 502, a status signal, e.g., the status signal 254, indicating whether a storage medium, e.g., the storage medium 208, is coupled to a socket of a controller, e.g., the controller 204, is transferred to a host, e.g., the host 202.

In block 504, power and a clock signal to a control unit, e.g., the control unit 212, of the controller are cut off if the status signal indicates that the storage medium is decoupled from the socket.

In block 506, the power and the clock signal to the control unit of the controller are turned on if the status signal indicates that the storage medium is coupled to the socket.

In block 508, a data transfer unit, e.g. the data transfer unit 210, is enabled and disabled by the control unit according to the status signal. In one embodiment, the data transfer unit is enabled if the status signal indicates that the storage medium is coupled to the socket and is disabled if the status signal indicates that the storage medium is decoupled from the socket.

In block 510, data is transferred according to control commands from the host if the data transfer unit of the controller is enabled.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for transferring data between a host and a storage medium, said controller comprising:

a data transfer unit transferring said data according to control commands from said host if said data transfer unit is enabled; and a control unit, coupled to said data transfer unit, that receives a status signal indicating whether said storage medium is coupled to a socket of said controller, that controls said data transfer unit according to said status signal, and that provides a plurality of interruption signals to said host, wherein power and a clock signal for said control unit are cut off if said status signal indicates that said storage medium is decoupled from said socket.

2. The controller as claimed in claim 1, wherein said power and said clock signal for said control unit are turned on if said status signal indicates that said storage medium is coupled to said socket.

3. The controller as claimed in claim 1, wherein said control unit comprises a card detection circuit which receives said status signal, and enables and disables said data transfer unit according to said status signal.

4. The controller as claimed in claim 3, wherein said card detection circuit enables said data transfer unit if said status signal indicates that said storage medium is coupled to said socket, and wherein said card detection circuit disables said data transfer unit if said status signal indicates that said storage medium is decoupled from said socket.

5. The controller as claimed in claim 1, wherein said power and said clock signal for said data transfer unit are turned on if said status signal indicates that said storage medium is coupled to said socket, and wherein said power and said clock signal for said data transfer unit are cut off if said status signal indicates that said storage medium is decoupled from said socket.

6. The controller of claim 1, further comprising:

a filter, coupled to said socket, that generates said status signal provided to both said control unit and said host.

7. A data transfer system comprising:

a host;

a storage medium;

a controller coupled between said host and said storage medium and operable for transferring data between said host and said storage medium, said controller further comprising:

a data transfer unit transferring data according to control commands from said host if said data transfer unit is enabled;

a control unit, coupled to said data transfer unit, that receives a status signal indicating whether said storage medium is coupled to a socket of said controller, that controls said data transfer unit according to said status signal, and that provides a plurality of interruption signals to said host, wherein power and a clock signal for said control unit are cut off if said status signal indicates that said storage medium is decoupled from said socket.

8. The data transfer system as claimed in claim 7, wherein said power and said clock signal for said control unit are turned on if said status signal indicates that said storage medium is coupled to said socket.

9. The data transfer system as claimed in claim 7, wherein said control unit enables said data transfer unit if said status signal indicates that said storage medium is coupled to said socket, and wherein said control unit disables said data transfer unit if said status signal indicates that said storage medium is decoupled from said socket.

10. The data transfer system as claimed in claim 7, wherein said power and said clock signal for said data transfer unit are turned on if said status signal indicates that said storage medium is coupled to said socket, and said power and said clock signal for said data transfer unit are cut off if said status signal indicates that said storage medium is decoupled from said socket.

11. The data transfer system as claimed in claim 7, wherein said host further comprises a pin, which is operable for receiving said status signal from said filter.

12. The data transfer system as claimed in claim 7, wherein said storage medium comprises a flash media card.

13. A method for transferring data information between a host and a storage medium, said method comprising:

transferring a status signal indicating whether a storage medium is coupled to a socket of a controller to said host;

cutting off power and a clock signal to a control unit of said controller if said status signal indicates that said storage medium is decoupled from said socket;

transferring said data according to control commands from said host if a data transfer unit of said controller is enabled.

14. The method as claimed in claim 13, further comprising:

turning on said power and said clock signal to said control unit of said controller if said status signal indicates that said storage medium is coupled to said socket.

15. The method as claimed in claim 13, further comprising:

turning on said power and said clock signal to said data transfer unit if said status signal indicates that said storage medium is coupled to said socket; and cutting off said power and said clock signal to said data transfer unit if said status signal indicates that said storage medium is decoupled from said socket.

16. The method as claimed in claim 13, further comprising:

enabling and disabling said data transfer unit by said control unit according to said status signal.

17. The method as claimed in claim 16, further comprising:

enabling said data transfer unit if said status signal indicates that said storage medium is coupled to said socket, and disabling said data transfer unit if said status signal indicates that said storage medium is decoupled from said socket.

* * * * *